(12) United States Patent
Gaul et al.

(10) Patent No.: US 10,109,840 B2
(45) Date of Patent: Oct. 23, 2018

(54) RECHARGEABLE BATTERY PACK HAVING A CONTACT PLATE FOR CONNECTION TO A LOAD

(71) Applicant: Andreas Stihl AG & Co. KG, Waiblingen (DE)

(72) Inventors: Henrik Gaul, Korb (DE); Gernot Liebhard, Waiblingen (DE); Daniel Wagner, Winterbach (DE); Martin Schurr, Mutlangen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 181 days.

(21) Appl. No.: 14/968,722

(22) Filed: Dec. 14, 2015

(65) Prior Publication Data

US 2016/0172656 A1    Jun. 16, 2016

(30) Foreign Application Priority Data

Dec. 12, 2014 (DE) .................. 10 2014 018 474

(51) Int. Cl.
| | |
|---|---|
| *H01M 2/10* | (2006.01) |
| *H01M 2/30* | (2006.01) |
| *H01M 10/42* | (2006.01) |
| *H01M 2/34* | (2006.01) |

(52) U.S. Cl.
CPC .............. *H01M 2/30* (2013.01); *H01M 2/10* (2013.01); *H01M 2/1016* (2013.01); *H01M 2/348* (2013.01); *H01M 10/425* (2013.01); *H01M 2200/103* (2013.01)

(58) Field of Classification Search
None
See application file for complete search history.

(56) References Cited

U.S. PATENT DOCUMENTS

| | | | |
|---|---|---|---|
| 6,350,149 B1* | 2/2002 | Nakane | H01M 2/1022 439/500 |
| 7,688,596 B1* | 3/2010 | Gardner | H01G 9/016 174/520 |
| 8,686,689 B2 | 4/2014 | Lee | |
| 2010/0156350 A1 | 6/2010 | Murayama et al. | |

* cited by examiner

*Primary Examiner* — Sarah A. Slifka
*Assistant Examiner* — Haroon S. Sheikh
(74) *Attorney, Agent, or Firm* — Walter Ottesen, P.A.

(57) ABSTRACT

A rechargeable battery pack includes at least one individual cell which is accommodated in a cell holder and is in electrical contact on a contact side via a cell connector. An electric load is to be connected via a contact plate which has a plurality of plug-type connections, wherein the contact plate is located on one side face of the cell holder. In order to compensate positional tolerances between the plug-type connections of the contact plate and external connection contacts, a mount for the contact plate is provided on one side face of the cell holder, in which mount the contact plate is mounted so as to be displaceable in a displacement direction. The electrical connection between the individual cell and the contact plate is embodied by an elastic contact strip, wherein the contact strip is embodied so as to be resilient in a sprung fashion in the displacement direction of the contact plate.

22 Claims, 5 Drawing Sheets

RECHARGEABLE BATTERY PACK HAVING A CONTACT PLATE FOR CONNECTION TO A LOAD

CROSS REFERENCE TO RELATED APPLICATION

This application claims priority of German patent application no. 10 2014 018 474.9, filed Dec. 12, 2014, the entire content of which is incorporated herein by reference.

BACKGROUND OF THE INVENTION

Known rechargeable battery packs are usually made of an arrangement of a plurality of individual cells which are electrically connected to one another via cell connectors on one contact side in each case to form a cell assembly. The individual cells of the rechargeable battery pack are connected to an electric load via a contact plate which has a plurality of plug-type connections. The contact plate can be located on a side face of the cell holder.

Rechargeable battery packs of this type are, for example, inserted into holders of electrical implements in which connection contacts are provided which are aligned in the insertion direction and engage in the plug-type connections of the contact plate. When contact is made, it is necessary that the plug-type connections are aligned with the connection contacts in order to bring about safe and electrically loadable contacts.

If the connection contacts and the plug-type connections do not fit one another, poor contacts may be formed. If there are also vibrations caused by the implement, the connection contacts may lift off the plug-type connections, which can lead to increased contact wear under electrical loading. A high power drain from the rechargeable battery pack can also lead to an increase in temperature of the individual cells and of the electrical connections, as a result of which the position of the contact plate may change.

SUMMARY OF THE INVENTION

It is an object of the invention to provide a rechargeable battery pack from individual cells with a contact plate that even during operation achieves a continuous, electrically highly loadable connection between the connection contacts of a rechargeable battery holder and the plug-type connections on the contact plate.

The battery pack of the invention comprises: a cell holder having a side face and a contact side; an individual cell held in the cell holder; a cell connector electrically connecting the individual cell to the contact side; a contact plate having a plurality of plug connectors configured to connect to an electrical load; the contact plate being disposed on the side face of the cell holder; a mount for the contact plate disposed on the side face of the cell holder; the contact plate being accommodated in the mount in such a manner so as to be displaceable in a displacement direction; at least one elastic contact strip configured to be resilient in the displacement direction of the contact plate; and, the contact strip defining an electrical connection between the individual cell and the contact plate.

A mount for the contact plate is provided on one side face of the cell holder, wherein the contact plate is mounted so as to be displaceable in a displacement direction in the mount. The electrical connection between the individual cell or a cell assembly and the contact plate is formed by at least one elastic contact strip which is embodied so as to be resilient in sprung fashion in the displacement direction of the contact plate. The contact plate is held by the elastic contact strip, wherein the contact plate remains displaceable relative to the longitudinal axis of the contact strips. This ensures that the contact plate becomes aligned with its plug-type connections with the connection contacts in a rechargeable battery holder of an implement and that a mechanically secure connection is formed, which ensures safe conduction of current even under high electrical loading. A contact strip which heats up under electrical loading and possibly occurring changes in length can also be compensated by the contact strip itself. The elastic contact strip itself serves here as a resilient connection element, and the contact plate therefore continues to be displaceable.

The displaceability of the contact plate ensures, in particular, that when making contact with corresponding connection contacts, for example in a rechargeable battery shaft, the contact plate can align itself—with a spring effect of the elastic contact strips—with the connection elements of the rechargeable battery shaft, ensuring that contact is formed in a simple, electrically loadable fashion.

The contact strip has a longitudinal axis, wherein the extent of the contact strip in the direction of its longitudinal axis is many times greater than the width which is measured perpendicularly with respect to the longitudinal axis. This geometric shape favors a spring effect of the contact strip.

The longitudinal axis of the contact strip is expediently aligned parallel to the displacement direction of the contact plate in a connection section of the contact strip. The connection section which is aligned in the displacement direction of the contact plate advantageously extends along a first side face of the cell holder. In this context, the connection section is mechanically secured by a contact end on the contact plate and placed in electrical contact there.

In a further embodiment of the invention, the contact strip is aligned with its longitudinal axis in a lateral strip section of the contact strip, perpendicularly with respect to the displacement direction of the contact plate. In this context, the lateral strip section can be located aligned in parallel with a second side face of the cell holder.

The contact section and the lateral strip section advantageously adjoin one another. The connection section is expediently located on a first side face of the cell holder, while the lateral strip section is provided on another, second side face of the cell holder. The second side face of the cell holder adjoins the first side face of the cell holder, wherein the abutment edges of the first and second side faces form a corner of the rechargeable battery pack.

The lateral strip section is located, in particular, at an angle with respect to the connection section, wherein preferably an angle of approximately 90° is provided. This angle corresponds to the angle at which the first and second side faces adjoin one another.

The lateral strip section has a contact end which is electrically connected to a cell connector via a connection lug. The cell connector and the contact strip are advantageously embodied in one piece.

The contact plate is connected in the displacement direction to, in each case, one contact strip on edge regions lying opposite one another. The contact plate is advantageously located between the contact ends of the contact strips.

The mount for the contact plate is expediently formed in one piece with the cell holder. The mounting engages advantageously over plate edges, lying opposite one another, of the contact plate, wherein the plate edges over which there is engagement extend in the displacement direction.

In one embodiment of the invention, the displacement travel of the contact plate is bounded by at least one stop. The stop is expediently formed by a fin of the cell holder, which fin engages in a slot in the plate. This bounds the displacement travel in both displacement directions. The fin is advantageously embodied in structural terms via a foot section of the mount, with the result that the mount not only keeps the plate displaceable but also bounds the displacement travel of the plate.

The plug-type connections of the contact plate are embodied as rigid plug-type connections with planar, sprung contact tongues which are located aligned transversely with respect to the displacement direction.

A separate inventive concept which can also be an embodiment of the invention described above is the integration of an electrical fuse element into the contact strip. According to this concept there is provision to form, in the contact strip itself, an electrical fuse element to protect against electrical overloading. This fuse element is, in particular, a melting fuse, that is, in the case of electrical overloading as a result of an excessively high current the fuse element melts and disconnects the contact strip. In this context, a first electrical fuse element can be formed on one side of a longitudinal central axis of the contact strip, and a second electrical fuse element on the other side of the longitudinal central axis of the contact strip. The fuse elements are expediently connected electrically in parallel with one another on both sides of the longitudinal central axis.

In one simple embodiment of this independent concept of a fuse element, a recess is provided in the contact strip, between the contact end and the connection lug. This recess is arranged near to a longitudinal edge of the contact strip in such a way that the recess bounds, with a longitudinal edge of the contact strip, a material web which forms the weakened material portion of the contact strip, and therefore forms the fuse element. If in each case a recess is formed on both sides of the longitudinal central axis in the contact strip, it can be expedient to connect the recesses to one another via a longitudinal slot. In a side view of the contact strip, the recesses and the longitudinal slot connecting them have approximately the shape of a letter Z, wherein the one recess forms the foot of the letter Z, and the other recess the top of the letter Z. This physical embodiment maintains the mechanical stability of the contact strip, since the weakened material portion of the contact strip is distributed over the length thereof.

The recess in the contact strip therefore bounds with one longitudinal edge the material web on one side of a longitudinal central axis of the contact strip, and with the other longitudinal edge a line section of the contact strip on the other side of the longitudinal central axis. In this context, the configuration is advantageously effected here in such a way that the material web has a width which is measured transversely with respect to its central axis of the contact strip, and that the width of the longitudinal section which is measured in the same direction is wider than the material web itself.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
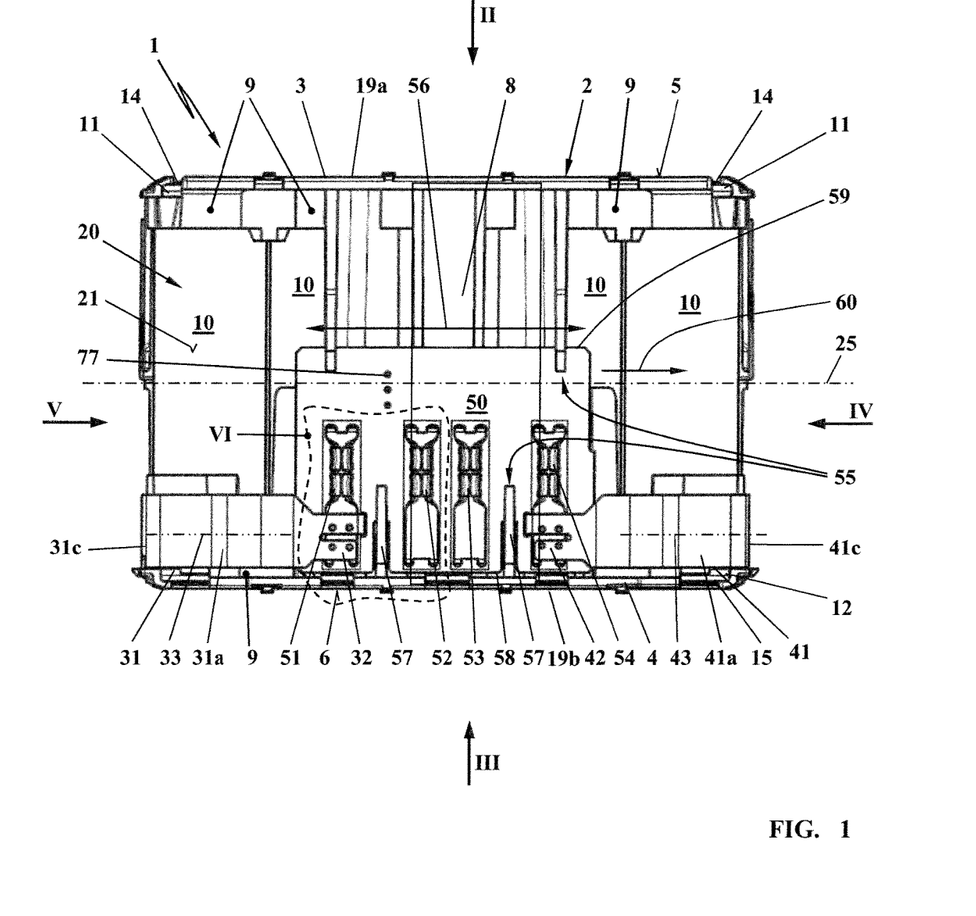
FIG. 1 is a view of a side face of a rechargeable battery pack with a contact plate.

The rechargeable battery pack 1 illustrated in FIG. 1 includes a cell holder 2 and at least one individual cell 10 which as a cylindrical base shape. In this embodiment, a plurality of individual cells 10 are combined to form a rechargeable battery pack 1. In each case one end 11 of an individual cell 10 forms a positive pole 14; another end 12, lying opposite, of the individual cell 10 forms a negative pole 15. The cell holder 2 is assembled from a first, upper cell trough 3 and a second, lower cell trough 4. The first, upper cell trough 3 forms a first, upper end side 5 of the rechargeable battery pack 1. The second, lower cell trough 4 forms a second, lower end side 6 of the rechargeable battery pack 1. The ends 11 and 12 of the individual cells 10 are held in assigned receptacles 9 in the cell troughs (3, 4). The one ends 11 of the individual cells 10 lie on a common, first contact side 19a of the cell holder 2. The other ends 12 of the individual cells 10 lie on a common, second contact side 19b of the cell holder 2. The first contact side 19a forms here the first, upper end side 5; and the second contact side 19b forms here the second, lower end side 6. The side face of the rechargeable battery pack 1, on which a connection board or contact plate 50 is arranged, advantageously connects the contact sides (19a, 19b) to one another. The contact plate 50 is therefore located on a circumferential side of the rechargeable battery pack 1.

In the embodiment shown, twenty individual cells 10 are held between the cell troughs 3 and 4 of the cell holder 2, wherein each individual cell 10 is fixed in position by its ends (11, 12) in a corresponding receptacle 9 of the cell troughs (3, 4). The two cell troughs (3, 4) are connected to one another via connecting webs (7, 8). In order to connect the cell troughs (3, 4), connecting webs 8 are arranged on the longitudinal sides (21, 22) (FIGS. 4, 5) of the side faces 20. Correspondingly, connecting webs 7 are provided on the narrow sides (23, 24) (FIGS. 4, 5) of the side faces 20. The connecting webs 8 are made wider than the connecting webs 7. The connecting webs (7, 8) fill the space between adjacent individual cells 10 and form a positively locking connection between the cell troughs 3 and 4. The cell holder 2 is embodied in a mechanically stable fashion as a structural unit.

Figure 2:
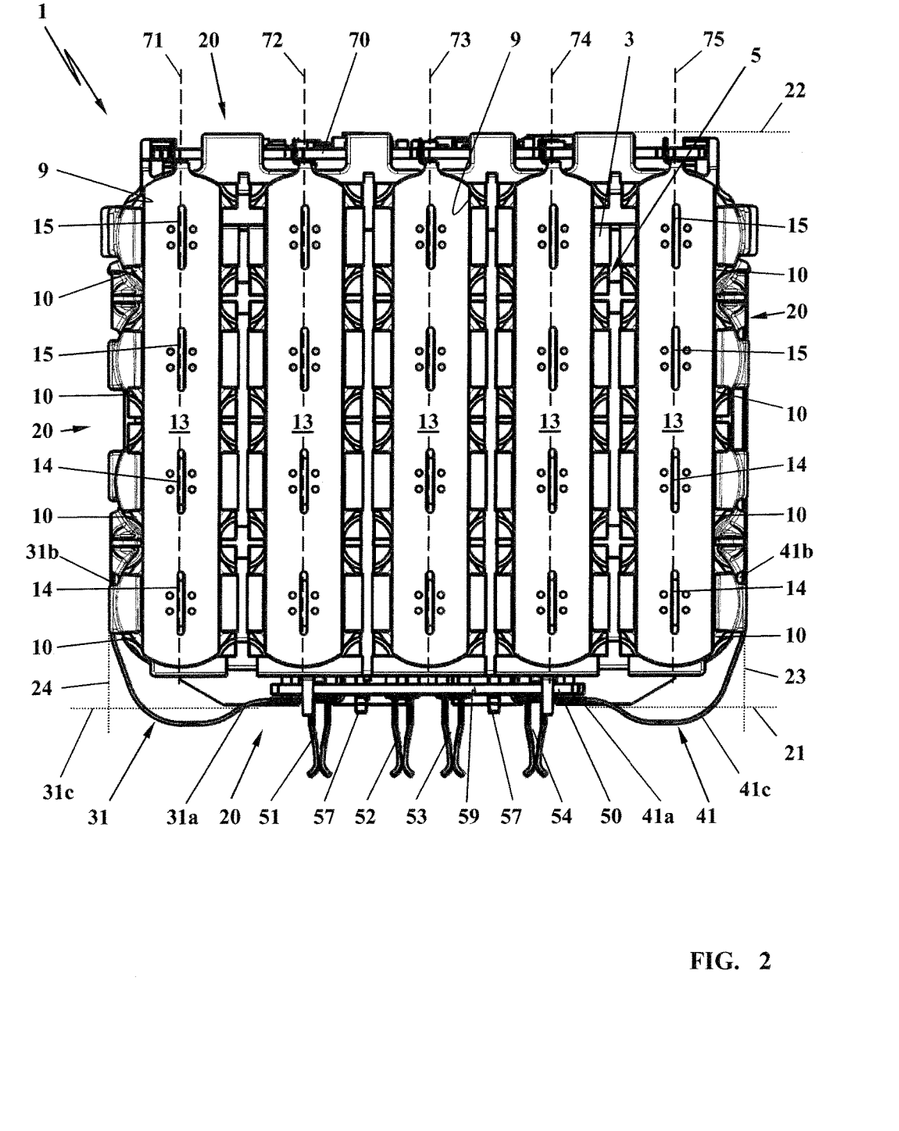
FIG. 2 shows a plan view of a first, upper end side of the rechargeable battery pack according to the direction of the arrow II in FIG. 1.

The individual cells 10 lie in five parallel rows (71, 72, 73, 74, 75) of four individual cells 10 each. Each individual cell 10 is held by its ends (11, 12) in assigned receptacles 9 of the cell troughs (3, 4). The receptacles 9 are opened toward the outside, with the result that the electrical poles (14, 15) of the individual cells 10 are exposed on the respective contact side (19a, 19b). As is apparent from the plan view according to FIG. 2, the poles (14, 15) of the individual cells 10 are connected electrically and mechanically to one another on the first end side 5 via cell connectors 13. In the embodiment according to FIG. 2, in each case two adjacent individual cells 10 are connected electrically and mechanically by their positive poles 14 so as to be electrically parallel to the cell connector 13, and are placed in contact with the negative poles 15 of the individual cells 10 which are located in the same row. As shown by FIG. 2, five cell connectors 13 are provided on the first end side 5 of the rechargeable battery pack 1, wherein one cell connector 13 forms in each case electrical contact between the positive poles 14 of two individual cells 10 and the negative poles 15 of two individual cells 10 of a row (71, 72, 73, 74, 75).

Figure 3:
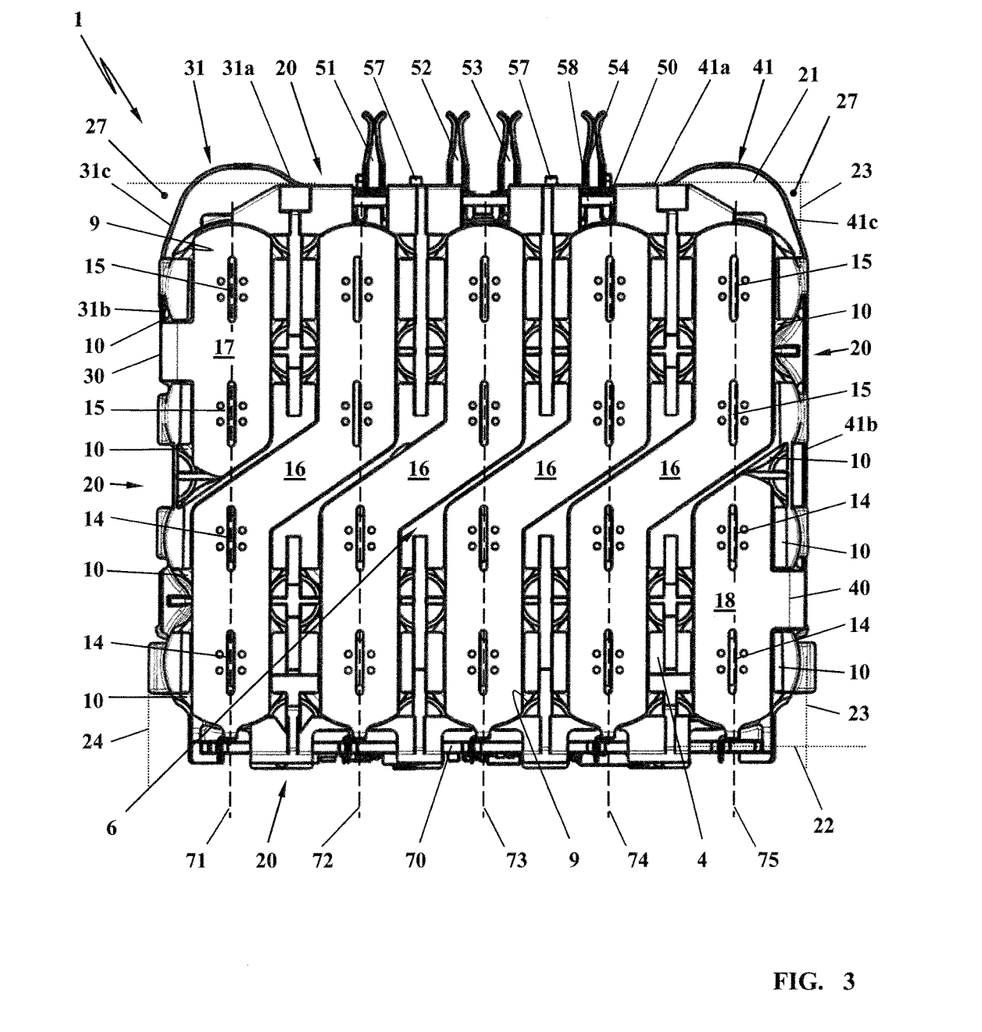
FIG. 3 shows a plan view of a second, lower end side of the rechargeable battery pack according to the direction of the arrow III in FIG. 1.

On the opposite second end side 6 of the rechargeable battery pack 1, cell connectors 16 are provided which connect to one another the rows (71, 72, 73, 74, 75), lying one next to the other, of the individual cells 10. The positive poles 14 are connected electrically and at the same time mechanically by two individual cells 10 of the one row 71 to the negative poles 15 of the adjacent row 72. The cell connectors 16 have an approximately Z-shaped form. In this way, the rows 71, 72, 73, 74 and 75 are placed in electrical contact with one another.

The negative poles 15 of the first row 71 are placed in electrical contact with a cell connector 17 which has a connection lug 30. The positive poles 14 of the last row 75 of the cell arrangement of the rechargeable battery pack 1 are connected to a cell connector 18 which has a connection lug 40. The connection lugs (30, 40) are bent by approximately 90° out of the plane of the contact side (19a, 19b), in particular bent at right angles. The bent connection lugs (30, 40) advantageously lie in the plane of a side face 20 of the cell connector 2. In the embodiment, the connection lug 30 of the cell connector 17 lies in the plane of the narrow side 24. The connection lug 40 of the cell connector 18 lies in the plane of the narrow side 23. The connection lugs (30, 40) can advantageously be located in parallel with the narrow sides (23, 24).

Figure 4:
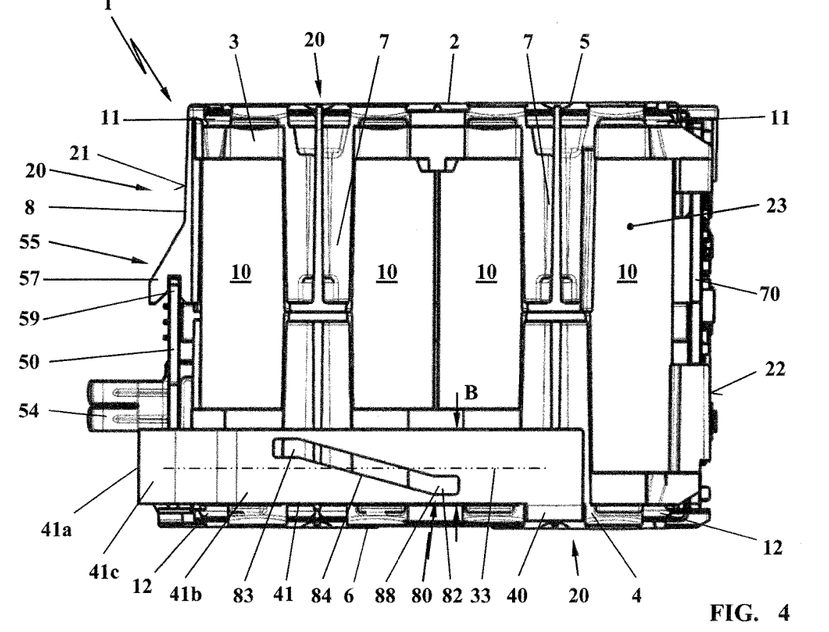
FIG. 4 shows a view of a further side face of the rechargeable battery pack in the direction of the arrow IV in FIG. 1.
Figure 5:
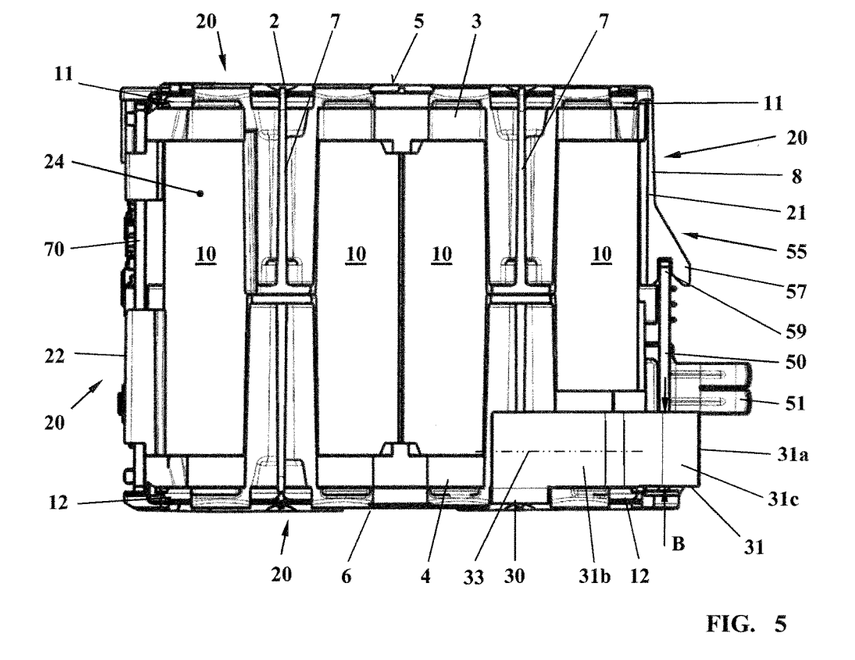
FIG. 5 shows a view of a further side face in the direction of the arrow V in FIG. 1.

Each of the connection lugs (30, 40) is connected electrically to a contact strip (31, 41). The contact strip (31, 41) has a longitudinal axis (33, 43), wherein the extent of the contact strip (31, 41) in the direction of its longitudinal axis (33, 43) is many times greater than a width B measured perpendicularly with respect to the longitudinal axis (33, 43) (FIGS. 4, 5).

The contact strip (31, 41), extends—at least with a lateral edge section (31b, 41b)—along the side faces 20 of the rechargeable battery pack 1. In the embodiment, the contact strip (31, 41) extends with a lateral strip (31b, 41b) along the narrow sides 23 and 24 of the rechargeable battery pack 1. The contact strip (31, 41) can have suitable contact ends for connecting to the contact lugs (30, 40). A contact strip (31, 41) is advantageously embodied in one piece with the assigned connection lug (30, 40) and/or with the assigned cell connector (17, 18).

The contact strips (31, 41) are guided with respect to the contact plate 50 which has a plurality of plug-type connections (51, 52, 53, 54) to make electrical contact of the rechargeable battery pack 1 with an electric load (not illustrated). The plug-type connections (51, 52, 53, 54) of the contact plate 50 are embodied as rigid plug-type connections with planar, sprung contact tongues. The contact tongues are located aligned transversely with respect to the displacement direction 56. The position of the contact tongues is preferably also aligned transversely with respect to the longitudinal axis 33 of the contact strips (31, 41).

The contact plate 50 lies on a side face 20 of the rechargeable battery pack 1. In the embodiment, the contact plate 50 lies on a longitudinal side 21 of the rechargeable battery pack 1, wherein, as shown in the figures, the contact plate 50 is arranged in parallel with the side face 20 or with the longitudinal side 21. The side face 20 of the cell holder 2, on which the contact plate 50 of the rechargeable battery pack 1 lies, connects the end sides (5, 6) of the rechargeable battery pack 1 to one another, that is, connects the contact sides (19a, 19b) of the rechargeable battery pack 1 to one another. It may be expedient to arrange the contact plate 50 on one narrow side (23, 24) of the rechargeable battery pack 1.

The contact plate 50, which forms a connection side of the rechargeable battery pack 1, is displaceably mounted in a mount 55. The mount 55 is expediently formed on the cell holder 2 and ensures the mobility of the contact plate 50 in at least one displacement direction 56. The displacement direction 56 extends in a plane of the side face 20, in particular in the direction of the side face 20, in the direction of the longitudinal side 21 in the embodiment. The displacement direction 56 of the contact plate 50 expediently extends in the direction of a central axis of the side face 20. In the embodiment, the displacement direction 56 of the contact plate extends in the direction of the longitudinal central axis 25 of the side face 20.

In order to mount the contact plate 50 in a displaceable fashion, the mount 55 engages over plate edges (58, 59) which lie opposite one another. As is shown by the FIGS. 4 and 5, the mount 55 is formed by claw-like or U-shaped hooks 57 which engage over the plate edges (58, 59).

The contact strips (31, 41) of the connection lugs 30 and 40 are guided onto the connection side, that is, onto a side face 20 of the rechargeable battery pack 1, by the narrow sides 23 and 24 via an edge 27 of the rechargeable battery pack 1. This side face 20 is a longitudinal side 21 of the rechargeable battery pack 1 in the embodiment. The contact strip 31 or 41 is mechanically secured by its contact end 32 or 42 on the contact plate 50. The mechanical securement is advantageously configured in such a way that an electrical connection to the plug-type connections (51, 54) for the power connection to the electrical load is formed. The plug-type connections (52, 53) serve to make electrical contact with a monitoring plate 70, which is secured to the cell holder 2 on the opposite longitudinal side 22. The connecting line 77 is provided for communication of the plug-type connections (52, 53) with the monitoring plate 70.

The contact strip (31, 41) is formed in the embodiment by three strip sections, specifically a connection section (31a, 41a), a lateral strip section (31b, 41b) and a bent strip section (31c, 41c), which connects a connection section (31a, 41a) to a lateral strip section (31b, 41b). It may be expedient to construct the contact strip (31, 41) with just one lateral strip section (31b, 41b).

The contact strip (31, 41) extends in the connection section (31a, 41a) in the direction of its longitudinal axis (33, 43), wherein the longitudinal axis (33, 43) of the connection section (31a, 41a) runs in the displacement direction 56 of the contact plate 50. The contact plate 50 is advantageously connected in the displacement direction 56 on opposite edge regions to, in each case, one contact end (32, 42) of a contact strip (31, 41). The contact plate 50 is advantageously located between the contact ends (32, 42) of the contact strips (31, 41). The connection section (31a, 41a) can be located here approximately in parallel with the side face 20 or with the longitudinal side 21 and/or with the contact plate 50. The contact strip (31, 41) is expediently located with its longitudinal axis (33, 43) in the connection section (31*a*, 41*a*), aligned in parallel with the displacement direction 56 of the contact plate 50.

The lateral strip section (31*b*, 41*b*) of the contact strip (31, 41) runs, in particular, in parallel with the side faces 20. In the embodiment, the lateral strip sections (31*b*, 41*b*) of the contact strip (31, 41) run in parallel with the narrow sides (23, 24) of the rechargeable battery pack 1. The contact strip (31, 41) is located with its longitudinal axis (33, 43) in the lateral strip section (31*b*, 41*b*) perpendicularly with respect to the displacement direction 56 of the contact plate 50.

As is shown by FIGS. 4 and 5, the lateral strip section 31*b* of the contact strip 31 is significantly shorter than the strip section 41*b* of the contact strip 41. This is because the connection lug 30 of the cell connector 17 is located closer to the connection side of the rechargeable battery pack 1 and therefore closer to the contact plate 50 than the connection lug 40 of the cell connector 18.

The connection section (31*a*, 41*a*) and the lateral strip section (31*b*, 41*b*) adjoin one another, wherein the connection section (31*a*, 41*a*) is located on a first side face 20 of the cell holder 2, and the lateral strip section (31*b*, 41*b*) is located on a second side face 20 of the cell holder 2. In this context, the second side face 20 adjoins the first side face 20 of the rechargeable battery pack 1. The connection sections (31*a*, 41*a*) and the lateral strip sections (31*b*, 41*b*) are advantageously connected to one another via a curved strip section 31*c* or 41*c*, wherein the curved strip section (31*c*, 41*c*) engages around the edge 27 of the rechargeable battery pack 1. The curved edge section (31*c*, 41*c*) extends over a curve angle of approximately 90° and is preferably configured as a compensation element which can compensate changes in position of the contact plate 50 in a sprung fashion. The curved strip section (31*c*, 41*c*) can compensate displacement of the contact plate 50 in the displacement direction 56 through elastic deformation. Alternatively or additionally, compensation of displacement of the contact plate 50 in the displacement direction 56 is also possible via the lateral strip section (31*b*, 41*b*). Compensation is achieved by virtue of the fact that the lateral strip section (31*b*, 41*b*) is deflected in a sprung fashion perpendicularly with respect to its plane.

The edge 27 is the region in which the side faces 20, in the embodiment the longitudinal side 21 and the narrow sides 23 and 24, adjoin one another. In accordance with the configuration of the rechargeable battery pack 1 as a cuboid rechargeable battery pack 1, the connection section (31*a*, 41*a*) is located at an angle with respect to the lateral strip section (31*b*, 41*b*). The angle is preferably approximately 90° and is configured as a right angle in the embodiment. The lateral strip section (31*b*, 41*b*) is connected here to the connection lug 30 or 40 of the cell connector 17 or 18. The cell connector (17, 18), its connection lug (30, 40) and the contact strip (31, 41) are advantageously embodied in one piece. The configuration is effected here in such a way that the contact strip (31, 41) is elastic, that is, the contact strip (31, 41) yields when the contact plate 50 is displaced in the displacement direction 56, for example through deformation or through spring deflection. If the contact plate 50 is displaced, for example in the direction 60 of the arrow, the elasticity of the arcuate strip section 41*c* and/or of the lateral strip section 41*b* permits a movement of the contact plate 50. Owing to the shape of the arcuate strip section 31*c* and/or the deflection of the lateral strip section 41*b*, compensation travel is made available, with the result that the contact plate 50 can deflect in the direction 60 of the arrow and counter to the direction 60 of the arrow without being impeded by the contact strips (31, 41).

Figure 6:
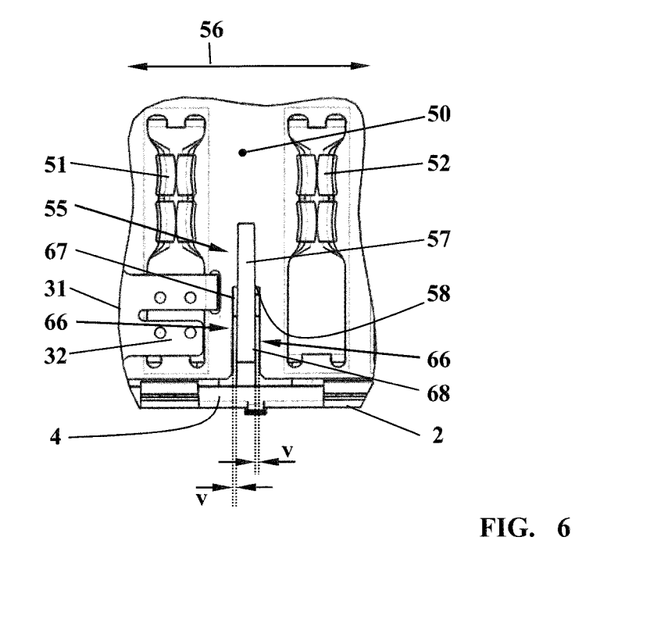
FIG. 6 shows an enlarged view of a mount of the contact plate with integrated stops for bounding a displacement travel according to the detail VI in FIG. 1; and, FIG. 7 shows a side view of a contact strip with a fuse element to protect against electrical overloading.

As is illustrated in FIG. 6, the displacement travel of the contact plate 50 is bounded by at least one stop 66. The stop 66 is expediently formed by a fin 68 of the cell holder 2, which fin 68 engages in a slot 67 in the plate 50. This limits the displacement travel (v) from a central position according to FIG. 6 in both displacement directions 56. The fin 68 is structurally advantageously embodied by a foot section of the mount 55, with the result that the mount 55 not only keeps the plate 50 displaceable but also limits the displacement travel (v) of the plate 50. The fin 68 expediently forms the foot section of the hook 57, which engages over the edge 58 of the plate 50.

Figure 7:
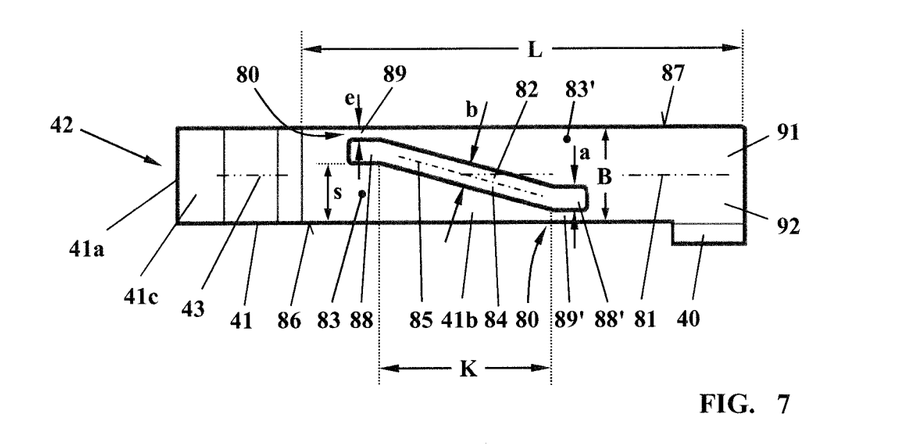

FIG. 7 shows the contact strip 41 illustrated in FIG. 4 in an enlarged illustration.

The contact strip 41 includes a connection section 41*a* with a contact end 42, via which the contact strip 41 is connected to the plug-type connection 54 (FIG. 1). The contact strip 41 merges, via the curved strip section 41*c*, with the lateral strip section 41*b* which runs parallel to the side face 20 of the rechargeable battery pack 1. In the embodiment, the contact strip 41 extends with its lateral strip section 41*b* along the narrow side 23 of the rechargeable battery pack 1 (FIG. 4). The strip section 41*b* of the contact strip 41 is electrically connected to the cell connector 18 via the connection lug 40. In the embodiment, the cell connector 18, the connection lug 40 and the contact strip 41 are embodied in one piece.

As is shown by FIGS. 4 and 7, in the embodiment the contact strip 41 extends from the contact end 42, secured to the plug-type connection 45, as far as the contact lug 40 connected to the cell connector 18, wherein a material weakened portion is formed, preferably in the strip section 41*b*, in the contact strip 41, which material weakened portion forms an electrical fuse element 80. This material weakened portion in the contact strip 41 is provided in the electrical connection between the contact end 42 and the connection lug 40 of the contact strip 41.

According to an independent inventive concept, the electrical fuse element 80 is embodied in the contact strip 41 as an electrical overload protection which is integrated into the contact strip 41, as illustrated in FIGS. 4 and 7.

In the contact strip 41 which is shown, a recess 88, which is formed in the strip section 41*b* between the connection section 41*a* and the connection lug 40, is provided for the material weakened portion. The strip section 41*b* of the contact strip 41 extends along the longitudinal axis 43, which forms a longitudinal central axis 81 in the embodiment according to FIG. 7. The longitudinal central axis 81 divides the strip section 41*b* of the contact strip 41 into an upper longitudinal section 91 and a lower longitudinal section 92. The upper longitudinal section 91 is bounded by the longitudinal central axis 81 and an upper longitudinal edge 87 of the contact strip 41; the lower longitudinal section 92 is bounded by the longitudinal central axis 81 and a lower longitudinal edge 86 of the contact strip 41.

The recess 88 bounds, with a longitudinal edge 86 or 87, a material web 89 which forms the material weakened portion of the contact strip 41.

The recess 88 which is provided to form the material web 89 is provided on one side of the longitudinal central axis 81 of the contact strip; in the embodiment shown, the recess 88 bounds, with the longitudinal edge 87, a first material web 89 in the upper longitudinal section 91 of the contact strip 41. At the same height of the first material web 89, the recess 88 bounds, on the other side of the longitudinal central axis 81, with the lower longitudinal edge 86 a relatively wide line section 83 of the contact strip 41. The line section 83 and the material web 89 are located in parallel with one another.

The width (e), measured perpendicularly with respect to the longitudinal axis 43 or orthogonally with respect to the longitudinal central axis 81, of the material web 89 is many times smaller than the width (s), measured in the same direction, of the line section 83. In particular, the width (s) of the line section 83 is more than three times, in particular five times, wider than the material web 89 which forms the fuse element 80.

In the embodiment shown, a recess (88, 88') is formed in the contact strip 41, on each of the two sides of the longitudinal central axis 81 in the strip section 41b, with the result that a material web (89, 89') is formed as a structurally embodied fuse element on each of the two sides of the longitudinal central axis 81. The material webs (89, 89') are located electrically in parallel with one another, that is, the material web 89 of the fuse element 80 on the one side of the longitudinal central axis 81 and the material web 89 of the fuse element 80 on the other side of the longitudinal central axis 81 of the contact strip 41 are located electrically in parallel with one another. The fuse elements are effective irrespective of the direction of the flowing current, that is, both during charging and during discharging.

The recesses (88, 88') which are provided in the contact strip 41 in order to form the material webs 89 are connected to one another by a longitudinal slot 84. The recesses (88, 88') are approximately rectangular to square in shape. A recess (88, 88') has, irrespective of its shape, a width (a) which is measured perpendicularly with respect to the longitudinal axis 43 or orthogonally with respect to the longitudinal central axis 81 and which is shorter than half the width B of the contact strip 41. The longitudinal slot 84, which connects the recesses (88, 88') to one another, has a slot central axis 85; the longitudinal slot 84 has a width (b) orthogonally with respect to the slot central axis 85. In a preferred configuration of the fuse element 80, there is provision that the width (b) of the longitudinal slot 84 which connects the recesses (88, 88') is equal to the width (a) of the recesses (88, 88').

In each case one recess (88, 88') is located on one side of the longitudinal central axis 81; a recess (88, 88') is therefore provided in each longitudinal section 91 or 92. The recesses (88, 88') are at a distance K from one another in the direction of the longitudinal axis 43 of the strip section 41, wherein the recess 88' in the lower longitudinal section 92 is located closer to the connection lug 40 than the recess 88 in the upper longitudinal section 91. The recess 88 in the upper longitudinal section 91 is located closer to the contact end 42 than the recess 88' in the lower longitudinal section 92.

The longitudinal slot 84 which connects the recesses (88, 88') intersects the longitudinal axis 43 of the contact strip 41. In the embodiment shown, the longitudinal slot 84 is located with a slot central axis 85 at an angle 82 with respect to the longitudinal axis 43 or with respect to the longitudinal central axis 81. The angle 82 has a value between 10° and 30°, in particular a value of 15°.

In the side view according to FIG. 7, the recesses (88, 88') have, together with the longitudinal slot 84, an approximately Z-shaped form, wherein the one recess 88' forms the foot of a Z, and the other recess 88 forms the top of a Z.

It is understood that the foregoing description is that of the preferred embodiments of the invention and that various changes and modifications may be made thereto without departing from the spirit and scope of the invention as defined in the appended claims.

What is claimed is:

1. A battery pack comprising:
a cell holder having a side face and a contact side;
a plurality of individual cells held in said cell holder, each of said individual cells having an electric pole;
a plurality of cell connectors electrically connecting said electric poles of said individual cells to other ones of said individual cells;
a connection board having a plurality of plug connectors for an electrical power connection to an electrical load, said connection board being arranged on said side face of said cell holder;
a mount for said connection board disposed on said side face of said cell holder, said connection board being accommodated in said mount in such a manner so as to be displaceable in a displacement direction; and
an elastic contact strip configured to be resilient in said displacement direction of said connection board and to form said electrical power connection between said individual cells and said connection board, said contact strip being configured to conduct current of said electrical power connection to the electrical load, said contact strip forming a portion of at least one of said plurality of cell connectors, wherein said contact strip is formed as an extension of said at least one of said plurality of cell connectors,
said at least one of said plurality of cell connectors and said contact strip are made of an electrically conducting material.

2. The battery pack of claim 1, wherein said contact strip defines a longitudinal axis, said contact strip has a length extending in the direction of said longitudinal axis, said contact strip has a width (B) measured perpendicular to said longitudinal axis, and said length of said contact strip is multiple times greater than said width (B).

3. The battery pack of claim 1, wherein said contact strip defines a longitudinal axis and has a connection section, and said contact strip is arranged such that said longitudinal axis is oriented parallel to said displacement direction in said connection section.

4. The battery pack of claim 3, wherein said connection section of said contact strip extends parallel to said side face of said cell holder.

5. The battery pack of claim 3, wherein said connection section has a contact end, and said connection section is mechanically fixed to said connection board via said contact end.

6. The battery pack of claim 1, wherein said contact strip defines a longitudinal axis and has a lateral strip section, and said contact strip is, in said lateral strip section, oriented with said longitudinal axis perpendicular to said displacement direction of said connection board.

7. The battery pack of claim 6, wherein said side face of said cell holder is a first side face, said cell holder has a second side face, and said lateral strip section is oriented parallel to said second side face.

8. The battery pack of claim 6, wherein said contact strip has a connection section, said contact strip is, in said connection section, oriented with said longitudinal axis parallel to said displacement direction of said connection board, said connection section and said lateral strip section adjoin each other, said side face of said cell holder is a first side face, said cell holder has a second side face, said connection section is disposed on said first side face, said lateral strip section is disposed on said second side face, and said second side face and said first side face mutually come together.

9. The battery pack of claim 1, wherein said contact strip has a connection section and a lateral strip section disposed at an angle to said connection section.

10. The battery pack of claim 9, wherein said connection section and said lateral strip section are disposed at a right angle to each other.

11. The battery pack of claim 1 further comprising a connection lug and said contact strip having a contact end connected to said cell holder via said connection lug.

12. The battery pack of claim 1, wherein said cell connector and said contact strip are configured to conjointly define an integral component.

13. The battery pack of claim 1, wherein said connection board has mutually opposite edge regions, said contact strip is a first contact strip, said battery pack comprises a second contact strip, and said first and second contact strips are connected to corresponding ones of said edge regions.

14. The battery pack of claim 1, wherein said mount and said cell holder are configured to conjointly define an integral component.

15. The battery pack of claim 1, wherein said connection board has opposite-lying plate edges extending in said displacement direction, and said mount engages over said opposite-lying plate edges.

16. The battery pack of claim 1, further comprising a stop, said connection board being configured to define a displacement path, and said displacement path being delimited by said stop.

17. The battery pack of claim 16, wherein said connection board defines a slot, said cell holder has a rib configured to engage in said slot, and said stop is formed by said rib.

18. The battery pack of claim 1, wherein said plug connectors have surface contact tongues oriented perpendicular to said displacement direction.

19. A battery pack comprising:
a cell holder having a side face and a contact side;
an individual cell held in said cell holder;
a cell connector electrically connecting said individual cell to said contact side;
a connection board having a plurality of plug connectors configured to connect to an electrical load, said connection board being disposed on said side face of said cell holder; and
at least one contact strip, said contact strip defining an electrical connection between said individual cell and said connection board, said contact strip having a first and a second electrical fuse element formed therein,
said first and second electrical fuse elements being configured to protect against electrical overload,
said contact strip defining a longitudinal center axis,
said first electrical fuse element being disposed on a first side of said longitudinal center axis, and
said second electrical fuse element being disposed on a second side of said longitudinal center axis.

20. The battery pack of claim 19, wherein
said first electrical fuse element and said second electrical fuse element are formed as material weakened portions of said contact strip, and said contact strip is configured to melt in a region of said material weakened portions and separate when said contact strip is electrically overloaded.

21. A battery pack comprising:
a cell holder having a side face and a contact side;
an individual cell held in said cell holder;
a cell connector electrically connecting said individual cell to said contact side; a connection board having a plurality of plug connectors configured to connect to an electrical load, said connection board being disposed on said side face of said cell holder;
at least one contact strip, said contact strip defining an electrical connection between said individual cell and said connection board, said contact strip having an first and a second electrical fuse element formed therein, said first and second electrical fuse elements being configured to protect against electrical overload, said contact strip defining a longitudinal center axis,
said first electrical fuse element being disposed on a first side of said longitudinal center axis, said second electrical fuse element being disposed on a second side of said longitudinal center axis,
said contact strip having a contact end and a connection lug, said contact strip defining a first recess disposed between said contact end and said connection lug, said contact strip has a first longitudinal edge and a second longitudinal edge,
wherein said first longitudinal edge and said first recess conjointly delimit a first material web forming a first materially weakened portion of said contact strip,
said contact strip defining a second recess disposed between said contact end and said connection lug,
said first recess being disposed on said first side of said longitudinal center axis,
said second recess being disposed on said second side of said longitudinal center axis, and
said contact strip defining a longitudinal slot interconnecting said first and said second recess.

22. The battery pack of claim 21, wherein said contact strip has a second longitudinal edge, and said second longitudinal edge and said second recess conjointly delimit a conductive section of said contact strip.

* * * * *